(12) United States Patent
Watanabe et al.

(10) Patent No.: US 8,126,593 B2
(45) Date of Patent: Feb. 28, 2012

(54) APPARATUS FOR DETECTING MALFUNCTIONS OF ELECTROMAGNETIC BRAKES OF ROBOT (75) Inventors: Kazunori Watanabe, Kariya (JP); Takamitsu Inagaki, Hazu-gun (JP)

(73) Assignee: Denso Wave Incorporated, Tokyo (JP)

( * ) Notice: Subject to any disclaimer, the term of this patent is extended or adjusted under 35 U.S.C. 154(b) by 550 days.

(21) Appl. No.: 12/379,422

(22) Filed: Feb. 20, 2009

(65) Prior Publication Data
US 2009/0216372 A1 Aug. 27, 2009

(30) Foreign Application Priority Data

Feb. 21, 2008 (JP) .................................. 2008-040020

(51) Int. Cl.
*B60L 7/00* (2006.01)
(52) U.S. Cl. ......... 700/245; 303/122; 188/161; 318/742
(58) Field of Classification Search .................. 700/165, 700/245, 250, 258, 292; 303/20, 121–122, 303/152, 156, 159, 191; 318/56–63, 86–87, 318/258–273, 400.09, 612, 614, 703, 741–742, 318/757; 188/70 B, 71.8, 72.1, 158, 161, 188/342; 187/206, 288
See application file for complete search history.

(56) References Cited

U.S. PATENT DOCUMENTS 7,285,927 B2 * 10/2007 Kuramochi et al. .......... 318/139
7,938,231 B2 * 5/2011 Ueda et al. .................... 187/288

FOREIGN PATENT DOCUMENTS

JP B2-3158914 4/2001

* cited by examiner

*Primary Examiner* — Mary Cheung
(74) *Attorney, Agent, or Firm* — Oliff & Berridge, PLC (57) ABSTRACT An apparatus is provided for detecting a malfunction occurring in an electromagnetic brake of a robot. In the apparatus, the main relay and the sub-relay are controlled to open the main contact and the sub-contact when the robot is activated. Detecting is then made whether or not the main contact is malfunctioning, by monitoring an energized state of the main contact. Activation of the robot is stopped when the main contact is malfunctioning and the main relay is controlled to close the main contact for a given period of time when that the main contact is operating normally. Detecting is further made as to whether or not the sub-contact is malfunctioning, by monitoring an energized state of the sub-contact The activation of the robot is stopped when the sub-contact is malfunctioning and the main relay is controlled to close the main contact when the sub-contact is operating normally.

14 Claims, 10 Drawing Sheets

APPARATUS FOR DETECTING MALFUNCTIONS OF ELECTROMAGNETIC BRAKES OF ROBOT

CROSS-REFERENCE TO RELATED APPLICATION

This application is based on and claims the benefit of priority from earlier Japanese Patent Application No. 2008-040020 filed Feb. 21, 2008, the description of which is incorporated herein by reference.

BACKGROUND OF THE INVENTION

1. Technical Field of the Invention

The present invention relates to an apparatus for detecting malfunctions of electromagnetic brakes for braking motors incorporated in a robot and how to check malfunctions of the electromagnetic brakes.

2. Related Art

In robots such as industrial robots working in factories, brake mechanisms that brake electric motors to drive robot arms are essential in properly controlling the coordinates positions and attitudes of robot joints of the arms. In general, each of the brake mechanisms is provided with an electromagnetic brake braking a motor with an excitation coil and relays switching over between the current supply state (energized) and the current no-supply state (non-energized) of the brake.

This break mechanism may operate erroneously when the relay(s) causes a malfunction, even if the electromagnetic brake itself can work normally. For example, if the relay(s) works erroneously so as to unlock (i.e., release) the brake, the arm may drop down from the robot.

In order to avid such a drawback, there can be provided a countermeasure to adopt a regenerating brake making use of regenerating energy from a motor in cases where the relay malfunctions. However, this countermeasure is not sufficient, because the regenerating brake by itself cannot prevent the arm form dropping down, although it can make the dropping speed of the arm slower. To improve this insufficient situation, there may be applied a technique disclosed by Japanese Patent No. 3158914, where a brake mechanism is subjected to detection of a malfunction which may occur in relays for electromagnet brakes.

Practically, the malfunction detecting technique provided by the above reference publication is mainly directed to the detection of errors of relays used with wheels that move along the ground surface. When it is detected that a relay is malfunctioning, the brake is locked. This malfunction detecting technique can be applied to a brake for the wheels of electric-motor coach, in which the coach can be prevented from running out of control even if the relay is brought into its malfunctioning state.

However, when this kind of malfunction detecting technique is applied to an industrial robot, there remains a drawback which cannot be removed by this technique. That is, the arms of an industrial robot should move in the space, which means that the arms should resist the gravitational force. Hence, if the brake mechanism for motors driving arms causes a malfunction, the locking action is performed after detecting the malfunction, which results in an after-the-fact control. Accordingly, an arm may have dropped down already when the brake mechanism is activated. It is thus impossible to avoid the arms from drooping in a reliable manner.

SUMMARY OF THE INVENTION

The present invention has been made in consideration of the above-stated situations, and it is an object of the present invention to provide an apparatus for detecting malfunctions of electromagnetic brakes for a robot in a reliable manner, while still suppressing inadvertent motions of the robot during the detection. The present invention also provides a method of reliably detecting such malfunctions.

In order to achieve the above object, as one aspect, the present invention provides an apparatus for detecting a malfunction caused in an electromagnetic brake of a robot, the electromagnetic brake for braking a motor incorporated in the robot, the electromagnetic brake being provided with an excitation coil and being locked when the excitation coil is not excited, the controller comprising: a main relay that has a main contact placed in a current supply path connected from a direct-current power source to the excitation coil and that is operable to open and close the main contact; a sub-relay that has a sub-contact placed between the main contact and the exaction coil in the current supply path; first energization detecting means that detects whether or not the main contact is energized; second energization detecting means that detects whether or not the sub-contact is energized; first control means for controlling the main relay and the sub-relay to open the main contact and the sub-contact when the robot is activated; first detecting means for detecting whether or not the main contact is malfunctioning, by monitoring an energized state of the main contact using the first energization detecting means in response to the control by the first control means, the energization of the main contact showing that the main contact Is malfunctioning; second control means for i) stopping activation of the robot when the first detecting means shows that the main contact is malfunctioning and ii) controlling the main relay to close the main contact for a given period of time when the first detecting means shows that the main contact is operating normally, the given period of time being set to a time length that allows the second energization detecting means to detect whether or not the sub-contact is energized; second detecting means for detecting whether or not the sub-contact is malfunctioning, by monitoring an energized state of the sub-contact using the second energization detecting means during the given period of time, the energization of the sub-contact showing that the sub-contact is malfunctioning; third control means for i) stopping the activation of the robot when the second detecting means shows that the sub-contact is malfunctioning and ii) controlling the main relay to close the main contact when the second detecting means shows that the sub-contact is operating normally.

Preferably, the third control means controls the main relay to open the main contact when the second detecting means shows that the sub-contact is malfunctioning.

Still preferably, the electromagnetic brakes consists of a plurality of electromagnetic brakes each having an excitation coil and each being locked when the excitation coil is not excited, the main relay is one in number; the sub-relay consists of a plurality of sub-relays each having a sub-contact, the sub-contacts of the sub-relays respectively being placed in a plurality of mutually-parallel current supply paths respectively connecting the excitation coils and the main contact; the second energization detecting means detects whether or not each of the sub-contacts is energized; and the second detecting means checks whether or not each of the sub-contacts is malfunctioning, by monitoring the energized state of each of the sub-contacts using the second energization detecting means.

It is also preferred that the controller comprises fourth control means for controlling the sub-relay to open the sub-contact every time when the robot has finished a given work routine; third detecting means for detecting whether or not the sub-contact is malfunctioning, by monitoring the energized state of the sub-contact using the second energization detecting means in response to the control of the fourth control means; and fifth control means for controlling the main relay to open the main contact when the third detecting means shows that the sub-contact is malfunctioning.

As a further aspect, the present invention provides a method of detecting a malfunction occurring in an electromagnetic brake of a robot, the electromagnetic brake for braking a motor incorporated in the robot, the electromagnetic brake being provided with an excitation coil and being locked when the excitation coil is not excited, a main relay having a main contact placed in a current supply path connected from a direct-current power source to the excitation coil and being operable to open and close the main contact, a sub-relay having a sub-contact placed between the main contact and the exaction coil in the current supply path, the method comprising: a first control step controlling the main relay and the sub-relay to open the main contact and the sub-contact when the robot is activated; a first detecting step detecting whether or not the main contact is malfunctioning, by monitoring an energized state of the main contact in response to the control by the first control step, the energization of the main contact showing that the main contact is malfunctioning; a second control step i) stopping activation of the robot when the first detecting step shows that the main contact is malfunctioning and ii) controlling the main relay to close the main contact for a given period of time when the first detecting step shows that the main contact is operating normally, the given period of time being set to a time length that allows detection as to whether or not the sub-contact is energized; a second detecting step detecting whether or not the sub-contact is malfunctioning, by monitoring an energized state of the sub-contact during the given period of time, the energization of the sub-contact showing that the sub-contact is malfunctioning; a third control step i) stopping the activation of the robot when the second detecting step shows that the sub-contact is malfunctioning and ii) controlling the main relay to close the main contact when the second detecting step shows that the sub-contact is operating normally.

The remaining features and advantages of the present invention can be read from the following description which is accompanied by the drawings.

DETAILED DESCRIPTION OF THE PREFERRED EMBODIMENTS

Referring to the accompanying drawings, various embodiments of a robot controller according to the present embodiment, will now be described.

First Embodiment

Referring to FIGS. 1-5, a first embodiment of the robot controller according to the present invention will now be described.

Figure 1:
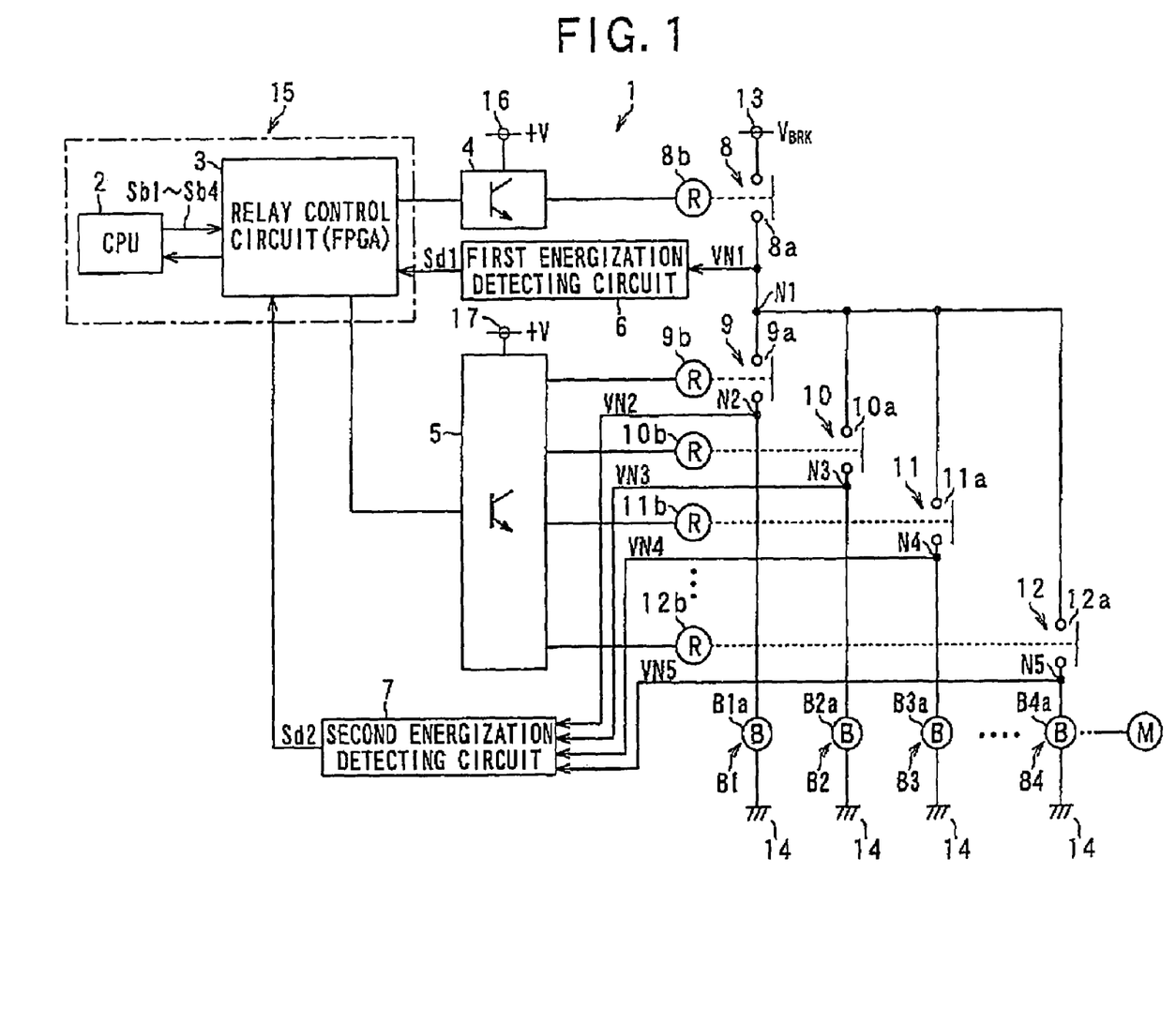
FIG. 1 is a block diagram showing the configuration of a robot controller according to a first embodiment of the present invention.

An industrial robot (not shown), to which a robot controller according to the present embodiment is provided, has a plurality of electric motors to actuate arms serving as movable portions of the robot and a plurality of electromagnetic brakes to brake the rotation of the motors. FIG. 1 shows part of the robot controller that controls such a robot, which part of the robot controller shows components to control the electromagnetic brakes.

In FIG. 1, the plurality of electromagnetic brakes are shown by four references B1-B4, which engage in controlling the operations of the motors (not shown). The electromagnetic brakes B1-B4 are provided with exaction coils B1$a$-B4$a$, respectively, and are produced as unexcitable operating type of electromagnetic brakes which operate to lock the brakes when the excitation cols B1$a$-B4$a$ are non-excited.

By the way, the number of electromagnetic brakes is not limited to four, and for example, the electromagnetic brakes may be five or more in number or may be three or less in number.

The robot controller 1 shown in FIG. 1 (, which composes the electromagnetic brake controller for the robot,) is provided with a CPU (central processing unit) 2, a relay control circuit 3, a main relay drive circuit 4, a sub-relay drive circuit 5, first and second energization detecting circuits 6 and 7, a main relay 8, and sub-relays 9-12.

The main relay 8 comprises a main contact 8$a$ and a relay coil 8$b$. When the relay coil 8$b$ is excited by current, the main contact 8$a$ is made to be closed (ON). Meanwhile the sub-relay 9 comprises a sub-contact 9$a$ and a relay coil 9$b$. When the relay coil 9$b$ is excited by current, the sub-contact 9$a$ is made to be closed (ON). In the similar manner to this, each of the sub-relays 10-12 is provided with a sub-contact 10$a$ (-12$a$) and a relay coil 10$b$ (-12$b$).

In the robot controller 1, there are also provided a braking power source 13 and a circuitry portion to be connected to the ground 14. Between the braking power source 13 and the ground 14, the main contact 8$a$, the sub-contact 9$a$ and the excitation coil B1$a$ are electrically connected in series, in which the main contact 8$a$ and the sub-contact 9$a$ are mutually connected via a point which is called a common connection point N1. Between this common connection point N1 and the ground 14, there are arranged three serial circuits, which are composed of a serial circuit consisting of the sub-contact 10$a$ and the excitation coil B2$a$, a serial circuit consisting of the sub-contact 11$a$ and the excitation coil B3$a$, and a serial circuit consisting of the sub-contact 12a and the excitation coil B4a, which are all normally open type.

This circuitry allows the breaking power source 13 and the ground 14 to apply direct-current (DC) voltage VBRK to both ends of each of the excitation coils B1a-B4a. In addition, in this circuitry, the voltage applied state (energized state) of the excitation coils B1a-B4a is switched between two-stage open/close operations of both the main contact 8a and the sub-contacts 9a-12a.

The CPU 2 is provided to control the operations of the electromagnetic brakes B1-B4 by controlling the drive of the main and sub-relays 8 and 9-12. The relay control circuit 3 is produced by using, by way of example, FPGAs (Field Programmable Gate Arrays), but this circuit 3 may be produced using gate arrays or using combined discrete electronic parts.

The relay control circuit 3 is formed to output drive signals toward the main and sub-relay drive circuits 4 and 5 in response to brake control commands Sb1-Sb4, so that the main and sub-relays 8 and 9-12 are driven. The brake control commands Sb1-Sb4 are directed to the electromagnetic brakes B1-B4, respectively, and using these commands, the CPU 2 is able to individually lock and unlock the braking operations of the electromagnetic brakes B1-B4. In the present embodiment, each of the brake control commands Sb1-Sb4 is a binary signal having H and L levels, in which the H level corresponds to a command to lock the brake (the brake lock command), while the L level corresponds to a command to unlock the brake (the brake unlock command).

The relay control circuit 3 is formed to determine whether or not the main relay 8 and the sub-relays 9-12 are malfunctioning when the robot controller 1 is started up. This determination is called a first malfunction check in the present embodiment. The relay control circuit 3 is formed to further determine whether or not the main relay 8 and the sub-relays 9-12 are malfunctioning whenever the robot completes a given work routine. This determination is called a second malfunction check in the present embodiment. When a malfunction is detected by the first or second malfunction check, the relay control circuit 3 is brought into a command rejecting mode where the relay control circuit 3 rejects the brake unlock command issued from the CPU 2 and instead, issues a malfunction notifying signal to the CPU 2. When receiving the malfunction notifying signal, the CPU 2 recognizes that there occurs a malfunction in the relays and stops the control operations of the robot.

The above command rejecting mode is realized by a circuit arranged in the input stage of the relay control circuit 3. Practically, in this input stage circuit, there are OR gates each having two input ends, one of which receiving a H-level fixed signal and the other of which receiving each of the brake control commands Sb1-Sb4, so that the brake control commands Sb1-Sb4 are masked (invalidated). In the present embodiment, the CPU 2 and the relay control circuit 3 composes control means 15.

The main relay drive circuit 4 comprises a photo coupler that receives DC voltage +V from a DC power source 16 and operates on the DC voltage +V. When being activated, the main relay drive circuit 4, which electrically isolates the relay control circuit 3 from the main relay 8, supplies current to the relay coil Sb in accordance with a drive signal issued from the relay control circuit 3. Meanwhile, the sub-relay drive circuit 5 comprises a photo coupler that receives DC voltage +V from a DC power source 17 and operates on the DC voltage +V. When being activated, the sub-relay drive circuit 5, which electrically isolates the relay control circuit 3 from the sub-relays 9-12, supplies current to one(s) of the sub-relays 9b-12b in accordance with a drive signal issued from the relay control circuit 3.

Voltage VN1 appearing at the common connection point N1 is given to the first energization detecting circuit 6 serving as first energization detecting means. This first energization detecting circuit 6 includes a photo coupler, which isolates the main relay 8 and the relay control circuit 3 from each other and outputs to the relay control circuit 3 a detection signal Sd1 indicative of the value of the voltage VN1. The relay control circuit 3 uses this detection signal Sd1 (that is, the value of the voltage VN1) to detect a state where the value of the voltage VN1 is equal (i.e., substantially equal) to the DC voltage VBRK. If such a voltage-equal state is detected, the relay control circuit 3 determines that the main contact 8a is in the current applied state.

As shown in FIG. 1, there is provided a common connection point N2 connected in common with both the sub-contact 9a and the excitation coil B1a, a common connection point N3 connected in common with both the sub-contact 10a and the excitation coil B2a, a common connection point N4 connected in common with both the sub-contact 11a and the excitation coil B3a, and a common connection point N5 connected in common with both the sub-contact 12a and the excitation coil B4a Voltages VN2-VN5 appearing respectively at the common connection points N2-N5 are given to the second-application detecting circuit 7.

The second energization detecting circuit 7, which serves as second current-application detection means, comprises a photo coupler to electrically isolate the sub-relays 8-12 and the relay control circuit 3 from each other. With this electrical isolation retained, this circuit 7 outputs to the relay control circuit 3 a detection signal Sd2 indicative of the value of each of the voltages VN2-VN5. When receiving this detection signal Sd2, the relay control circuit 3 uses this signal Sd2 to detect a state the value of corresponding one(s) of the voltages VN2-VN5 is equal (substantially equal) to the DC voltage VBRK. If this voltage-equal state is detected, the circuit 3 recognizes the corresponding one(s) of the sub-contacts 9a-12a is in the current-applied state.

The operations of the robot controller 1 according to the present embodiment will now be described.

Figure 2:
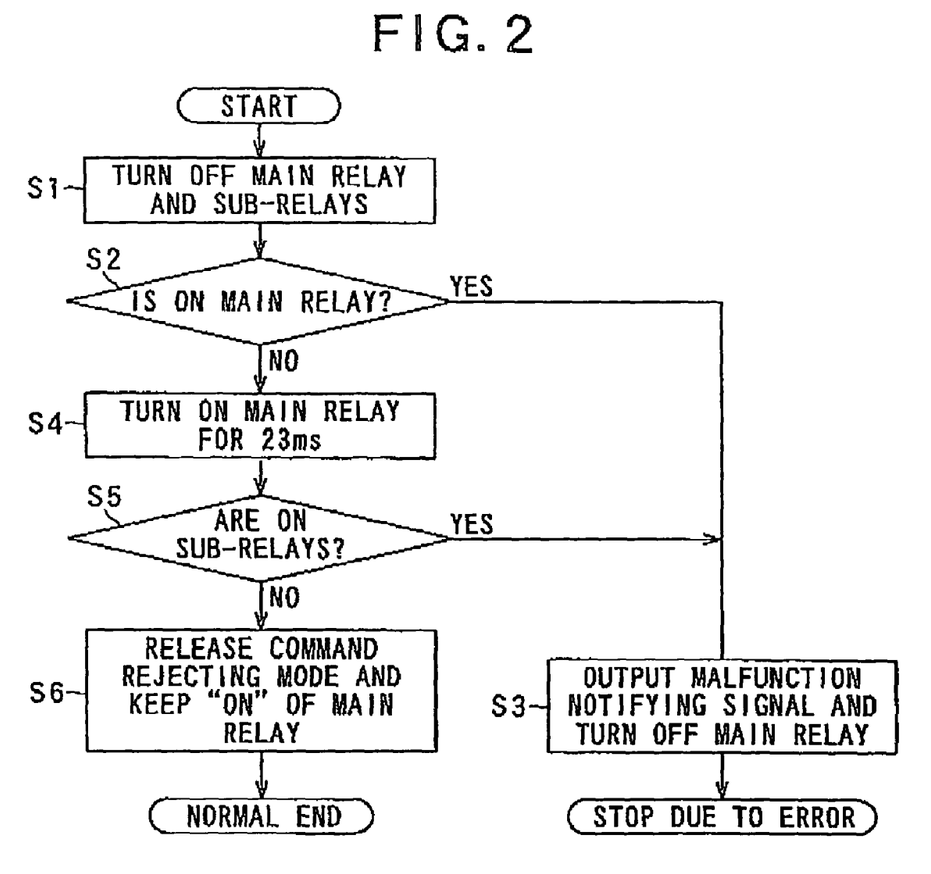
FIG. 2 is a flowchart showing a relay malfunction check performed when the robot is activated, in the first embodiment.
Figure 3:
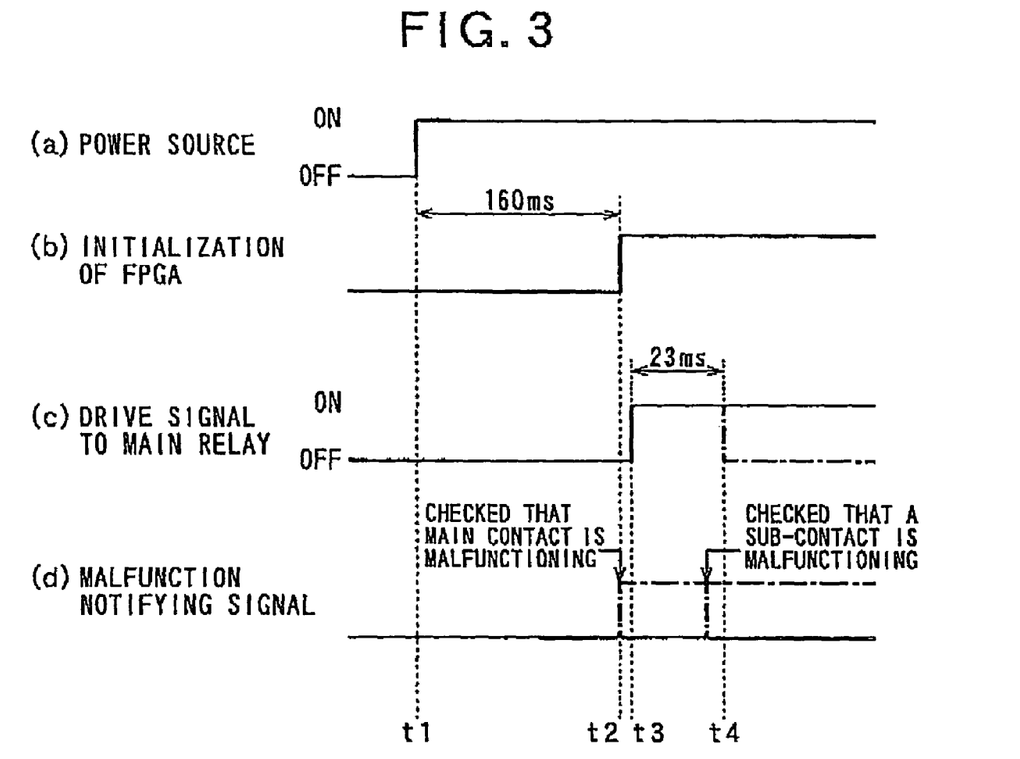
FIG. 3 is a timing chart explaining the operations in the relay malfunction check performed when the robot is activated.

FIG. 2 is a flowchart explaining how to determine a relay malfunction and how to control the relays, which are conducted when the robot is activated. FIG. 3 shows the signals and operations thereof with regard to the determination of a relay malfunction conducted when the robot is activated. In FIG. 3, the first stage (a) shows the power supplied to the robot controller 1, the second state (b) shows the initialized state of the relay control circuit 3, the third stage (c) shows the drive signal to the main relay 8, and the fourth stage (d) shows malfunction notifying signals. In the third and fourth stages (c) and (d), solid lines means that there is no malfunction in the relays, while dashed lines means that a malfunction has occurred in any one or more of the relays.

In the following, the operations of the robot controller 1, which are performed in response to its activation, will now be described in connection with FIGS. 2 and 3.

When the power of the robot controller 1 is turned on at a time instant t1 in FIG. 3, the initialization of the relay control circuit 3 (FPGA) starts, which initialization includes loading configuration data. This initialization completes approximately 160 msec after its start (refer to a time instant t2 in FIG. 3). At the time when the initialization completes, the relay control circuit 3 is set to the command rejecting mode in which the brake unlock command from the CPU 2 is rejected by the circuit 3 and drives the main relay 8 and the sub-relays 9-12 so as to open their main contact 8a and sub-contacts 9a-12a (step S1 in FIG. 2).

The relay control circuit 3 then checks the current application to the main contact 8a using the first energization detecting circuit 6 (step S2). Assume that the main contact 8a is closed because of its short-circuit or breakdown. In such a case, the relay control circuit 3 detects that the main contact 8a is in an energized state (i.e., subjected to a current application) (YES at step S2). Hence, based on the determination that the main relay 8 is malfunctioning, the relay control circuit 3 outputs the malfunction notifying signal to the CPU 2 (step S3), and then ends the process for the activation. This is a stop due to errors.

On the other hand, if it is found that the main contact 8a is opened, the relay control circuit 3 determines that the main contact 8a is not subjected to the current application (i.e., is in the no-application of current) (NO at step S2). In this case, the circuit 3 concludes that the main relay 8 is normally operating, so that this circuit 3 drives the main relay 8 such that its main contact 8a is closed for a given period of time (refer to a time instant t3 in FIG. 3 and step S4 in FIG. 2).

The given period of time during which the main contact 8a is closed is set to a time length necessary for the relay control circuit 3 to check, at least, the energized state of the sub-contacts 9a-12a using the second energization detecting circuit 7. In the present example, the period of time necessary for operating the main relay 8 is less than 20 msec and a delay in the second energization detecting circuit 7 is less than 3 msec. Hence the given period of time for closing the main contact 8a is set to 23 msec.

The relay control circuit 3 then checks the energized state of each of the sub-contacts 9a-12a using the second energization detecting circuit 7 during the closing action of the main contact 8a (that is, during an interval from the time instants t3-t4 in FIG. 3) (step S5). If it is assumed that, among the sub-contacts 9a-12a, when the sub-contact 9a is malfunctioning due to its short-circuit or breakdown, the relay control circuit 3 detects that the sub-contact 9a is in its energized state (YES at step S5 in FIG. 2). The circuit 3 thus determines the malfunction of the sub-relay 9, and then proceeds to step S3 to issue the malfunction notifying signal (step S3). Then the process for the activation is ended, which is a stop due to an error. The same is true of the other relays.

Meanwhile, when all the sub-contacts 9a-12a are opened, the relay control circuit 3 determines that all the sub-contacts 9a-12a are in their no-energized states (NO at step S5). In this case, all the sub-relays 9-12 are functioning normally. Hence the circuit 3 unlocks the command rejecting mode which has been set thereto and drives the main relay 8 so as to keep the "on (close) state" of the main contact 8a (step S6). After this, the process for the activation is ended, which is called a normal end.

Figure 4:
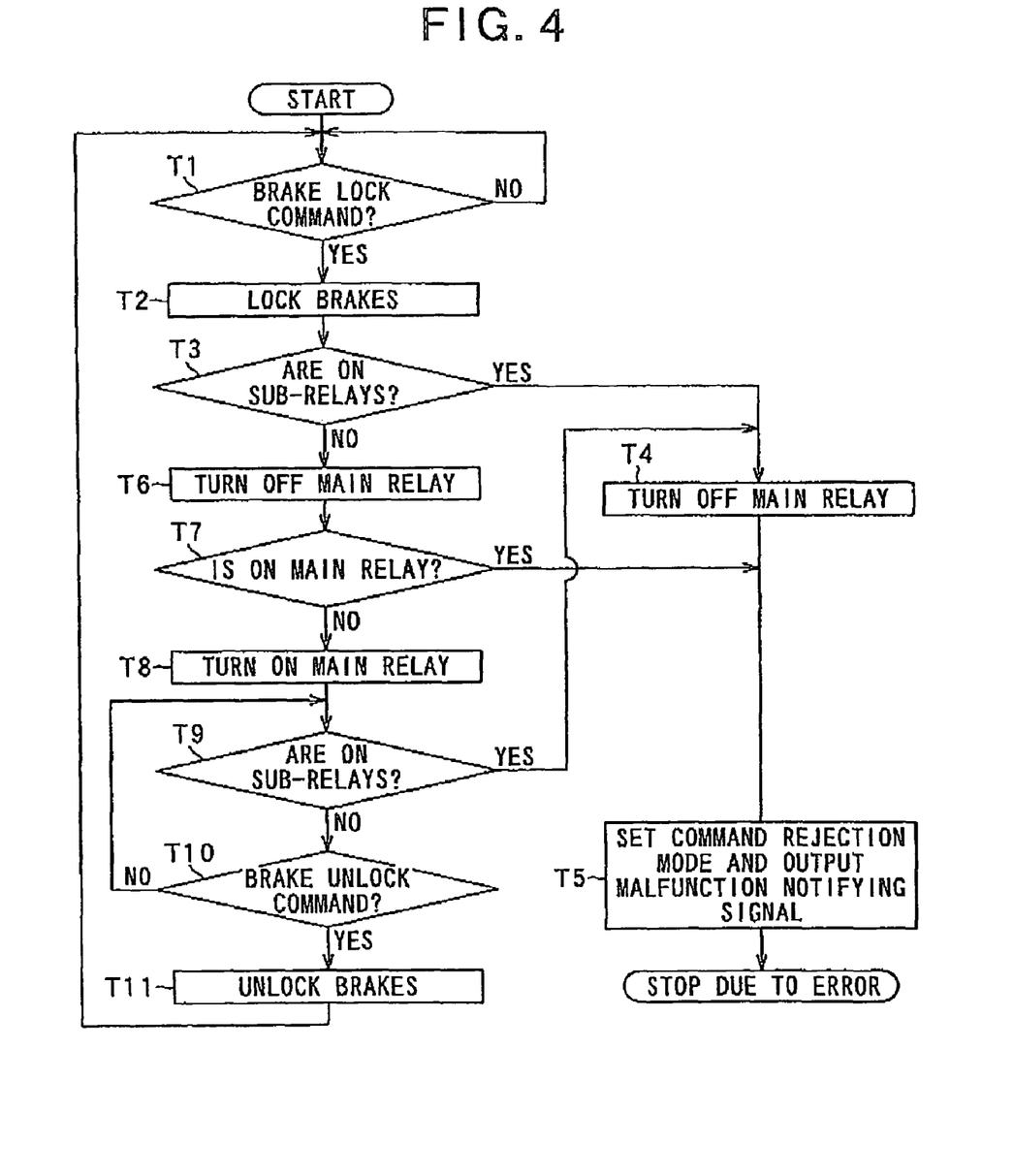
FIG. 4 is a flowchart showing a further relay malfunction check performed during an intermission between robot work routines in the first embodiment.
Figure 5:
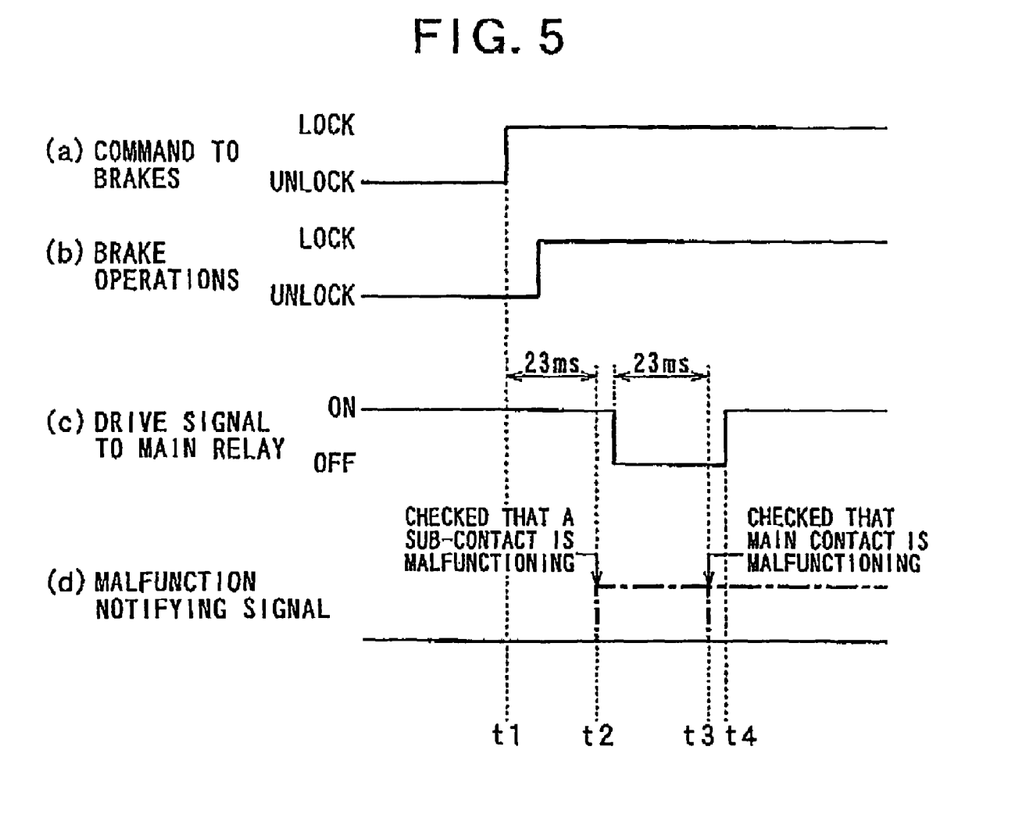
FIG. 5 is a timing chart explaining the operations in the further relay malfunction check performed during the intermission.

In connection with FIGS. 4 and 5, how to determine a malfunction occurring in the relays during a period of time provided between the same work routines assigned to the robot. FIG. 4 shows a flowchart for the determination, while FIG. 5 shows transitions of signals and operation states concerning with the determination of relay malfunctions. In FIG. 5, the first stage (a) shows the brake control command, the second stage (b) shows the operations of the brake, the third stage (c) shows the drive signal to the main relay, and the fourth stage (d) shows the malfunction notifying signal. In addition, in the third and fourth stages (c) and (d), solid lines indicate no malfunction in the relays, while dashed lines indicate some malfunction occurring in the relays.

Once the given work routine, which lasts intermittently, has finished once by the robot, the CPU 2 issues to the relay control circuit 3 a brake lock command to lock the operations of the electromagnetic brakes B1-B4 (refer to a time instant t1 in FIG. 5; YES at step T1 in FIG. 4). In response to the brake lock command, the relay control circuit 3 drives the sub-relays 9-12 so as to make their sub-contacts 9a-12a open (step T2). After this, the relay control circuit 3 waits for a given wait period of time until a time instant t2 in FIG. 5, and then checks the energization states of the sub-contacts 9a-12a using the second energization detecting circuit 7 (step T3). The check at step T3 must be performed after the sub-relays 9-12 have completed their drive actions. In consideration of this, the given wait period of time is set to a time length (23 msec) longer by a little time than the operation time (for example, 20 msec) of the sub-relays 9-12. Setting the wait time ensures that the electromagnetic brakes B1-B4 complete their lock operations during the period of time between the time instants t1 and t2 in FIG. 5.

In the present example, assume that the sub-contact 9a is closed. In this case, the relay control circuit 3 detects that the sub-contact 9a is energized at present (YES at step T3), so that the circuit 3 determines that the sub-relay 9 is malfunctioning. In response to this determination, the circuit 3 drives the main relay 8 to open (the "off" state) its main contact 8a (step T4). The relay control circuit 3 then self-sets itself to the command rejecting mode. In parallel, this circuit 3 outputs to the CPU 2 the malfunction notifying signal (step T5), before ending its process, which is a stop due to occurrence of an error (i.e., malfunction).

On the other hand, when all the sub-contacts 9a-12a are opened, the relay control circuit 3 detects the no-current-applied states of all the sub-contacts (NO at step T3). In this case, the circuit 3 decides that all the sub-relays 9-12 are normally operating, and drives the main relay 8 to make the main contact 8a open (step T6). After this, the circuit 3 waits for a given period of time (e.g., 23 msec). The relay control circuit 3 then checks the energization state of the main contact 8a using the first energization detecting circuit 6 at a time instant t3 in FIG. 5 (step T7). This check should also be performed after the completion of drive of the main relay 8. Hence, the given period of time for waiting is set to a time length of 23 msec which is properly longer than the operation time (approx. 20 mec) of the main relay 8.

If the main contact 8a is closed, the relay control circuit 3 detects that the main contact 8a is energized by current supply (YES at step T7), and determines that the main relay 8 is malfunctioning. In this case, the process proceeds to step T5, where the command rejecting mode is set and the malfunction notifying signal is issued, before the process is ended due to the error. In contrast, when the main contact 8a is opened, the relay control circuit 3 detects the non-energization of the main contact 8a (NO at step T7), so that the circuit 3 determines that the main relay 8 is operating normally. Accordingly, the circuit 3 drives the main relay 8 to close the main contact 8a at a time instant t4 in FIG. 5 (step T8).

By using the second energization detecting circuit 7, the relay control circuit 3 monitors the energization states of the sub-contacts 9a-12a for a period of time lasting until reception of the brake unlock command from the CPU 2 prior to starting the next work routine (steps T9 and T10). Assume that the sub-contact 9a is closed. In this case, the step T9 allows the relay control circuit 3 to detect that the sub-contact 9a is energized by current (YES at step T9), thus concluding that the sub-relay 9 is malfunctioning. Thus the process is made to proceed to step T4, before stopping the process due to an error.

When all the sub-contacts 9a-12a are opened and the brake unlock command is issued from the CPU 2, the determination at steps T9 and T10 become YES. In this case, the processing allows the relay control circuit 3 to drive the sub-relays 9-12 so as to open their sub-contacts 9a-12a, whereby the electromagnetic brakes B1-B4 are unlocked (step T11). The process is then returned to step T1 as shown in FIG. 4.

As described, the present embodiment provides the following operations and advantages.

The energization states of excitation coils B1a-B4a of the unexcitable operating type of electromagnetic brakes B1-B4 can be checked by the two-stage open/close operations of the main contact 8a and sub-contacts 9a-12a. The first open/close stage is controlled by the relay control circuit 3 when the robot is first activated. In this case, the main relay 8 is first subjected to determination about whether or not the main relay 8 is malfunctioning, and, only when the main relay is operating normally, the sub-relays 9-12 are then subjected to determination about whether or not the sub-relays 9-12 are malfunctioning. As described before, this is the first malfunction check. For determining malfunctions which may occur in the sub-relays 9-12, the main contact 8a is made to close for the minimum period of time necessary for detecting the energization of the sub-contacts 9a-12a.

Accordingly, if the sub-relay 9 (-12) is malfunctioning because of, for example, the short-circuit of the sub-contact 9a (-12a), the electromagnetic brakes B1-B4 are unlocked only during closing the main contact 8a. Movable members of the robot, which are for example arms, may move; however, when the main contact 8a is opened, the movable members are locked immediately after the electromagnetic brakes B1-B4 are locked. It is therefore possible to suppress inadvertent robot's actions, such as robot's actions resulting from unlocking, during which time the electromagnetic brakes B1-B4 are subjected to detecting malfunctions.

In addition, the relay control circuit 3 is able to perform the second malfunction check to check malfunctions of the sub-relays 9-12 in a period of time which is present between given work routines. In this period of time, it is usual that the robot does not have work and its brakes are locked. Hence, the electromagnetic brakes B1-B4 can be tested effectively in terms of their malfunctions. Moreover, every time the work routine is finished, the second malfunction check is performed, whereby it is possible to increase the frequency of the malfunction check for the electromagnetic brakes B1-B4.

Furthermore, when the robot controller 1 is activated and when the second malfunction check detects a malfunction, the operation mode of the relay control circuit 3 is set to the command rejection mode where the circuit 3 rejects the brake unlock command from the CPU 2. Hence, even if the CPU 2 erroneously outputs the brake unlock command, the electromagnetic brakes B1-B4 are prevented from being unlocked during detecting malfunctions. This makes it possible to suppress robot's Inadvertent actions in a more reliable manner and check malfunctions which may be caused in the electromagnetic brakes B1-B4.

Second Embodiment

Referring to FIGS. 6-10, a second embodiment of the robot controller according to the present invention will now be described.

In the second embodiment, the similar or identical components to those in the first embodiment will be given the same reference numerals for the sake of a simplified description.

Figure 6:
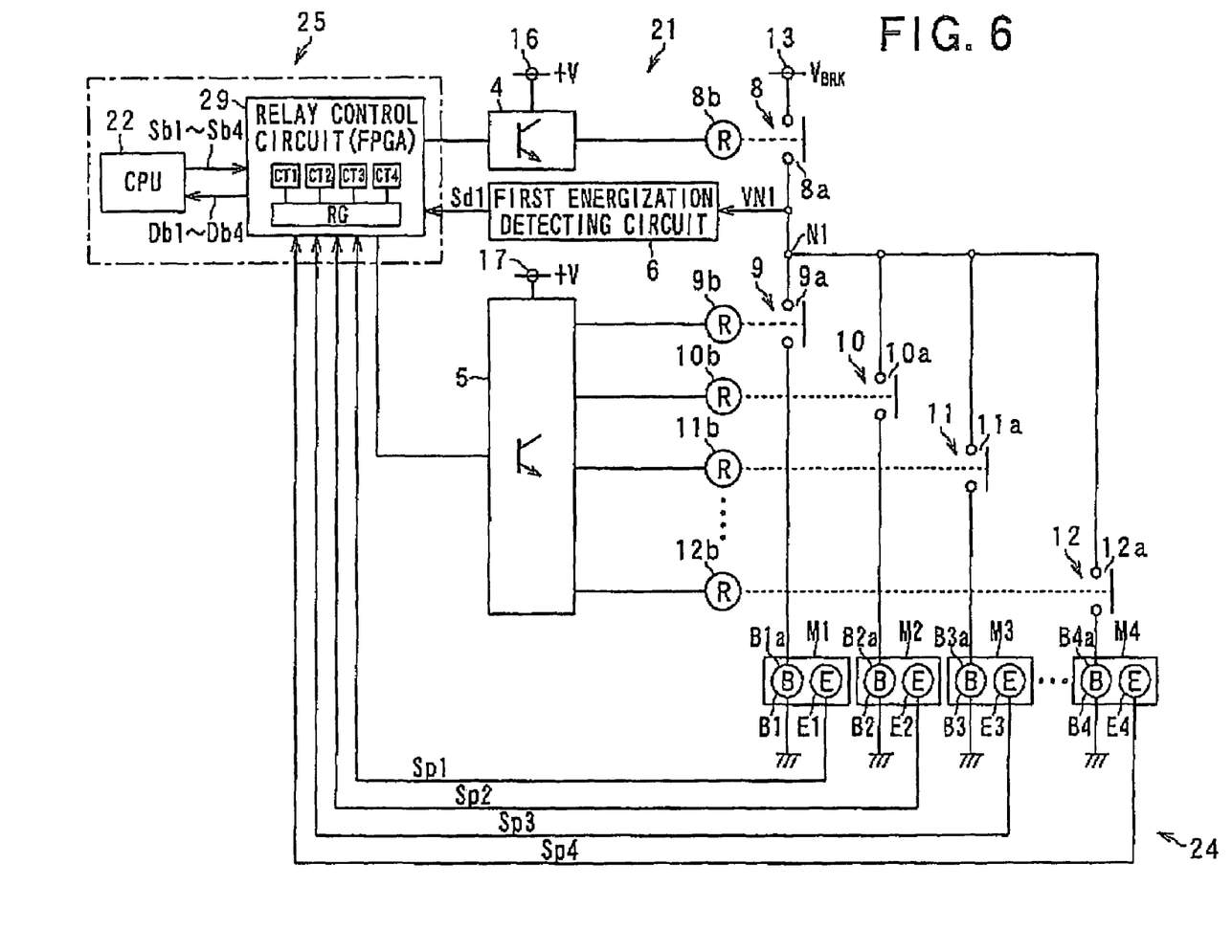
FIG. 6 is a block diagram showing the configuration of a robot controller according to a second embodiment of the present invention.

FIG. 6 shows a robot controller 21 according to the second embodiment, where this controller 21 is different from the robot controller 1 of the first embodiment in that there are provided a CPU 22, a relay control circuit 23, and encoders E1-E4 instead of the CPU 2, the relay control circuit 3 and the second energization detecting circuit 7.

The encoders E1-E4, which compose motor rotation detecting means, are produced to output pulse signals Sp1-Sp4 depending on rotating positions of plural motors M1-M4 assembled with the robot, respectively. These encoders, which are integrally assembled with the motors, respectively, are thus used to control the rotation of the motors M1-M4. As a modified form, the encoders may arranged outside the motors.

The relay control circuit 23 is provided with a plurality of counters CT1-CT4 each counting the number of pulses given by each of the pulse signals Sp1-Sp4 respectively coming from the encoders E1-E4 and a register RG comprising a plurality of register regions storing therein the count of each of the counters. The counters CT1-CT4 may be provided together with the encoders E1-E4.

In the relay control circuit 3, the counts of the counters CT1-CT4, which are counted in the condition where the electromagnetic brakes B1-B4 are locked, are respectively stored in the register RG as references Dr1-Dr4 respectively showing the reference rotating positions of the motors M1-M4. Additionally, the counts of the counters CT1-CT4, which are counted in the condition where the relays are checked in their malfunctions, are also respectively stored in the register RG as current values Dp1-Dp4 showing the current rotating positions of the motors M1-M4 respectively at a time instant at which relays' malfunction detecting is about to start. A difference Dp1 (-Dp4) between each of the references Dr1-Dr4 and each of the current values Dp1-Dp4 are also stored in the register RG. The differences Dp1-Dp4 indicate amounts of rotation of each of the motors M1-M4, thus being referred as rotation amount data. By the way, if the counters can be initialized to zero, the register regions in the register RG, into which the references Dr1-Dr4 are to be stored, are not necessary.

The CPU 22 reads the differences Dd1-Dd4 stored in the register RG when the relay malfunction detecting is performed. The CPU 22 then compares the read-in difference Dd1 (-Dd4 with a given threshold Dth to check whether or not the motor M1 (-M4) is rotating. This threshold Dth is set to a value which allows the CPU 22 to accurately detect the rotation of each of the motors M1-M4.

In cases where any of the motors M1-M4 are rotating, the respective sub-contact(s) 9a-12a which correspond to the rotating motor(s) M1 (-M4) are closed. In consideration of the relationship between the rotation of the motors M1-M4 and the open/close states of the sub-contacts 9a-12a, the present embodiment adopts the way of detecting the rotation of the motors M1-M4, in place of detecting the energization the sub-contacts as described in the first embodiment. From the functional viewpoint, the second energization detecting means 24 is composed of the encoders E1-E4 and the relay control circuit 23. The control means 25 is composed of the CPU 22 and the relay control circuit 23.

The operations of the robot controller 1 according to the second embodiment will now be described.

Figure 7:
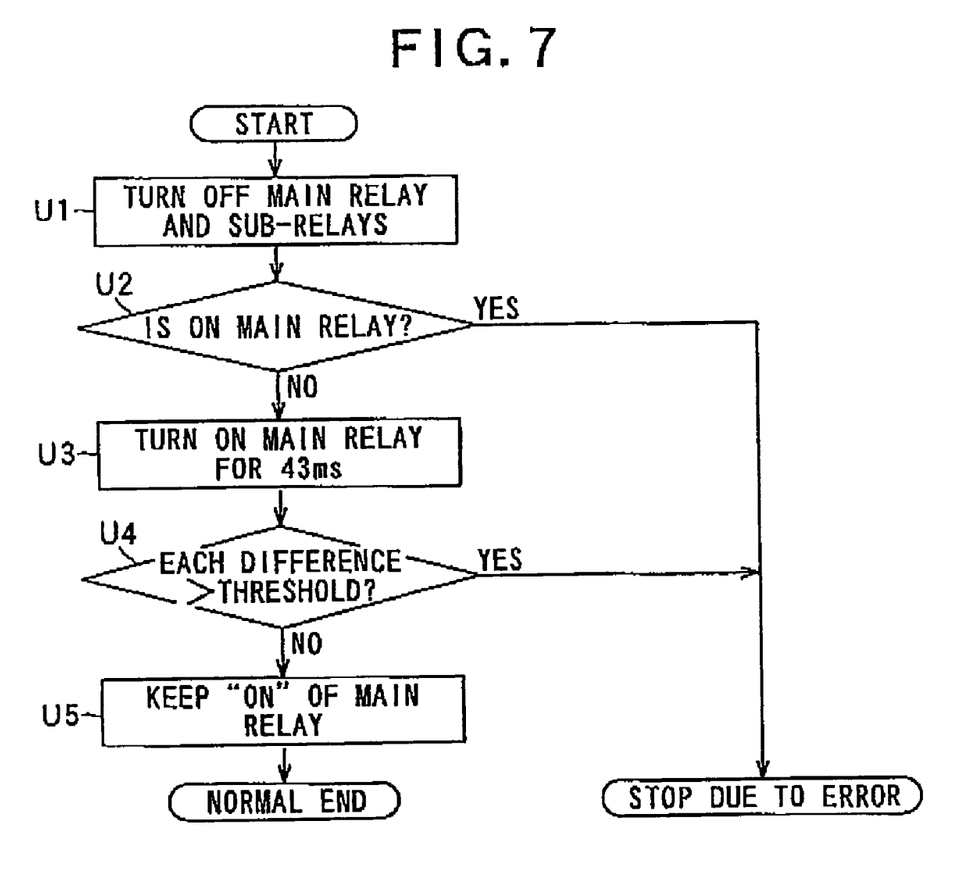
FIG. 7 is a flowchart showing a relay malfunction check performed when the robot is activated. In the second embodiment.
Figure 8:
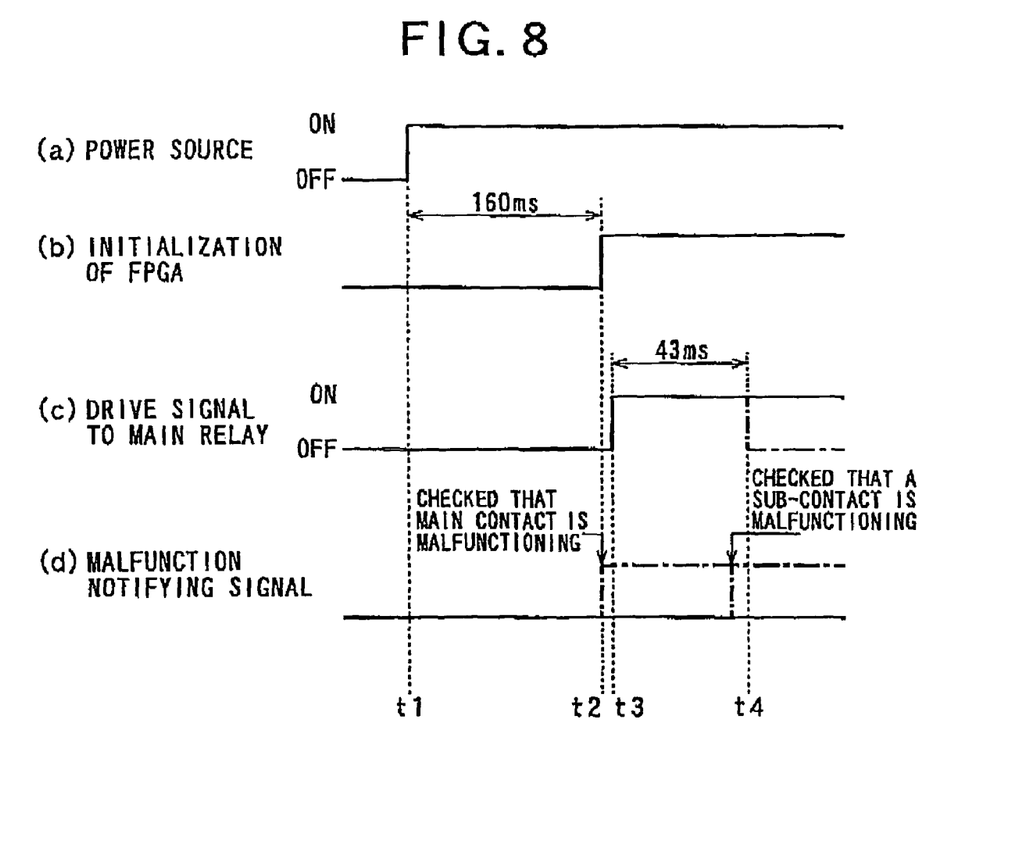
FIG. 8 is a timing chart explaining the operations in the relay malfunction check performed when the robot is activated, in the second embodiment.

Unlike the first embodiment, the CPU 22 mainly functions as a controller that issues various commands for the first and second malfunction checks. FIGS. 7 and 8 show the operations of the robot controller 21 performed when being activated.

When the power is turned on in the robot controller 21 at a time instant t1 shown in FIG. 8, the relay control 23 is first initialized. When this initialization is finished at a time instant t2 shown in FIG. 8, the CPU 22 starts its operations by driving the main relay 8 and the sub-relays 9-12 to open the main contact 8*a* and the sub-contacts 9*a*-12*a* via the relay control circuit 23 (step U1 in FIG. 7). At this time instant, the relay control circuit 23 stores the references Dr1-Dr4 into its register RG.

The CPU 22 then uses the relay control circuit 23 and the first energization detecting circuit 6 to check the energized state of the main contact 8*a* (at the time instant t2 in FIG. 8; step U2 in FIG. 7). If the main contact 8*a* is closed, the CPU 22 can detect that the main contact 8*a* is energized (YES at step U2). Hence the CPU 22 determines that the main relay 8 is malfunctioning, thus ending this relay check process for the activation. This is a stop due to an error. In contrast, when the main contact 8*a* is opened, the CPU 22 can detect a non-energized state of the main contact 8*a* (NO at step U2), so that the CPU 22 recognizes that the main relay 8 is operating normally. In this case, the CPU 22 drives the main relay 8 to close its main contact 8*a* only for a given period of time (time instants t3 and t4 in FIG. 8: step U3 in FIG. 7). This given period of time is also set to a minimum time length which allows the CPU 22 to check the rotation of the motors M1-M4 and is 43 msec in the present embodiment.

During the close operation of the main contact 8*a* (that is, during the period from t3 to t4 in FIG. 8), in the relay control circuit 23, the current values Dp1-Dp4 are stored in the register RG and differences Dd1-Dd4 between the references Dr1-Dr4 and the current values Dp1-Dp4 are also stored in the register RG. Thus the CPU 22 reads out the differences Dp1-Dp4 from the register RG, and compares the read-out differences Dp1-Dp4 with a threshold Dth to individually check the rotation states of the motors M1-M4 (step U4 In FIG. 7).

In this case, if the sub-contact 9*a* is closed due to a malfunction, the difference Dd1 becomes larger than the threshold Dth, so that the CPU 22 determines that the motor M1 is rotating because the sub-relay 9 is malfunctioning (YES at step U4). Hence the CPU no longer performs the relay check process for the activation (i.e., the stop due to an error). On the other hand, if all the sub-contacts 9*a*-12*a* are opened, the differences Dp1-Dp4 are smaller than the threshold Dth. In this case, the CPU 22 determines that all the motors M1-M4 are stopped and all the relays 9-12 are operating normally (NO at step U4). The CPU 22 then drives the main relay 8 to keep the "on close state" of the main contact 8*a* (step U5), before ending the relay check process for the activation (i.e., normally ended).

Figure 9:
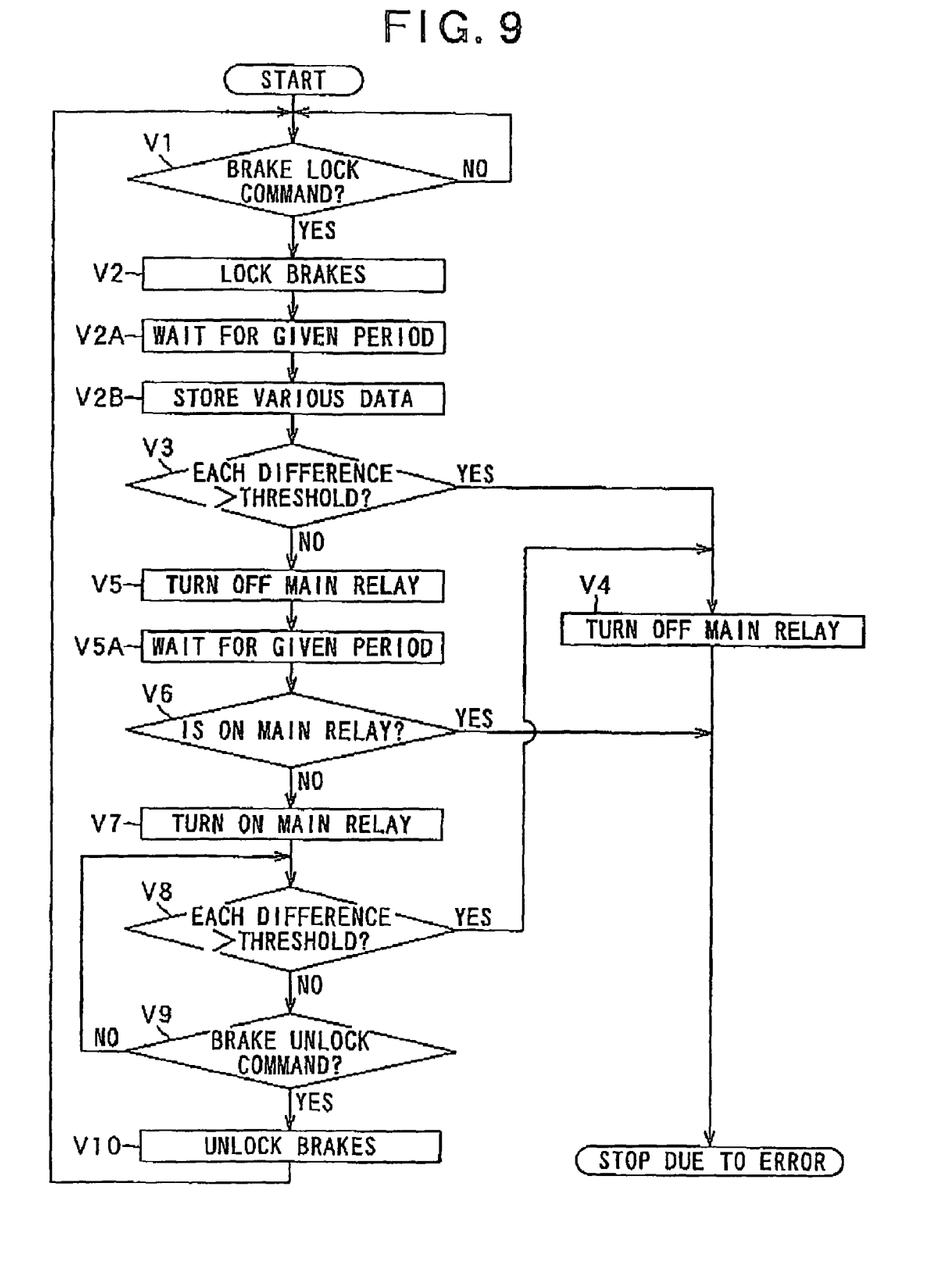
FIG. 9 is a flowchart showing a further relay malfunction check performed during an intermission between robot work routine in the second embodiment.
Figure 10:
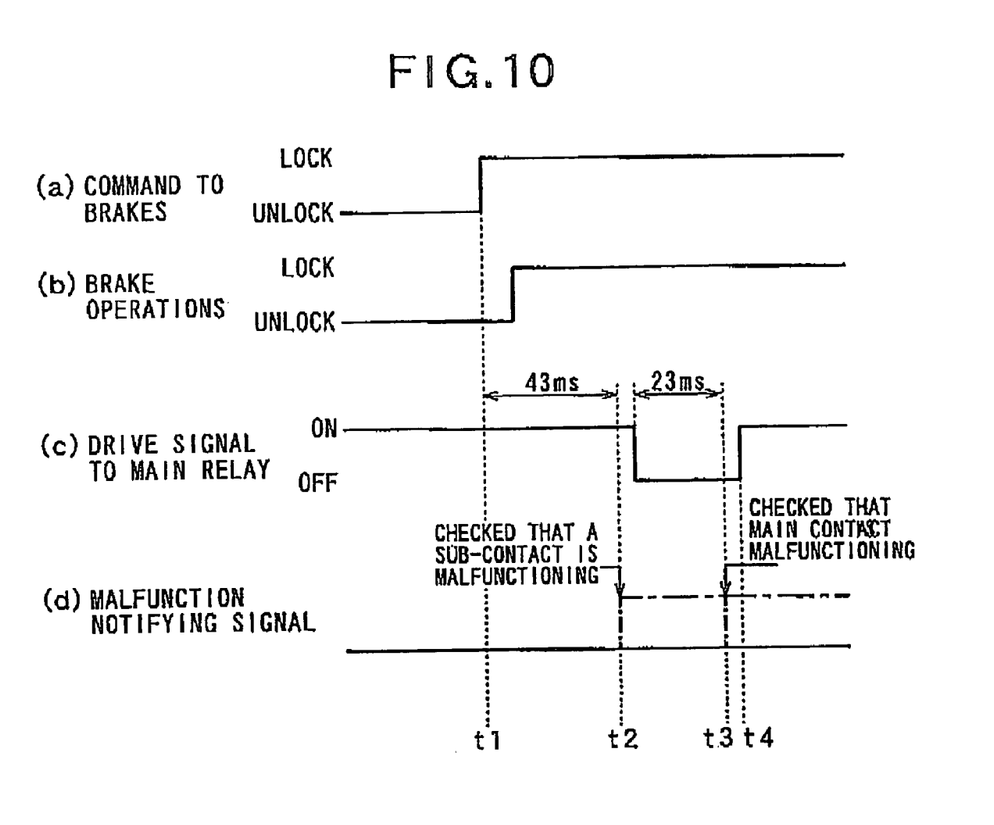
FIG. 10 is a timing chart explaining the operations in the further relay malfunction check performed during the intermission in the second embodiment.

FIGS. 9 and 10 show a relay check process performed during a period of time provided between work routines of the robot.

When the robot has finished one cycle of its given work routine, the CPU 22 issues a brake lock command for the electromagnetic brakes B1-B4 (a time instant t1 in FIG. 10: YES at step V1 in FIG. 9). In response to this command, the relay control circuit 23 drives the sub-relays 9-12 to open their sub-contacts 9*a*-12*a* (step V2 in FIG. 9). In parallel with this, the references Dr1-Dr4 are stored into the register RG of the relay control circuit 23.

The CPU 22 then waits for a given period of time (i.e., a period from t1 to t2 in FIG. 10: step V2A in FIG. 9). When the given period of time has passed, the CPU 22 allows the relay control circuit 23 to store the current values Dp1-Dp4 into the register RG, and to calculate and store the differences Dd1-Dd4 between the references Dr1-Dr4 and the current values Dp1-Dp4 into the register RG (step V2B in FIG. 9). Then the CPU 22 reads out the differences Dd1-Dd4 from the register RG to make a comparison between the differences Dd1-Dd4 and the threshold Dth. This results in detecting the rotation states of the motors M1-M4 (step V3 in FIG. 9), The check step at step V3 in FIG. 9 should be performed when the number of pulses of each of the pulse signals Sp1-SP4 from the encoders E1-E4 has changed sufficiently depending on the rotation of the motors M1-M4, provided that the motors M1-M4 rotate. Accordingly, the given period of time from t1 to t2 is set to 43 msec, for instance.

Assume that the sub-contact 9*a* is closed. In this case, the difference Dd1 is larger than the threshold Dth, with the result that the CPU 22 detects that the motor M1 is rotating and the sub-relay 9 is malfunctioning (YES at step V3). Hence, the CPU 22 drives the main relay 8 to open its main contact 8*a* (step V4 in FIG. 9), before ending the relay check process during the robot work routines (a stop due to an error). Of course, this is true of the other sub-contacts 10-12.

In contrast, when all the sub-contacts 9*a*-12*a* are open, all the differences Dd1-Dd4 are smaller than the threshold Dth. Hence, the CPU 22 detects that all the motors M1-M4 do not rotate and none of the sub-relays 9-12 are operating normally (NO at step V3), and drives the main relay 8 to open its main contact 8*a* (step V5 in FIG. 9).

After this, the CPU 22 waits for a given period of time (e.g., 23 msec: step V5A in FIG. 9), and checks the energized state of the main contact 8*a* using the first energization detecting circuit 6 (a time instant t3 in FIG. 10: step V6 in FIG. 9). This check at step V6 should be performed after the main relay 8 has completed its drive. In consequence, the given period of time required at step V5A is set to an amount properly longer than the operation time (e.g., approx. 20 msec) of the main relay 8.

When the main contact 8*a* is closed, the CPU 22 detects that the main contact 8*a* is energized and, that is, the main relay 8 is malfunctioning (YES at step V6). In this case, the relay check process is stopped due to an error. Meanwhile when the main contact Sa is closed, the CPU 22 detects that the main contact 8*a* is not energized and, that is, the main relay 8 is operating normally (NO at step V6). In this case, the CPU 22 operates to drive the main relay 8 to close its main contact 8*a* (at a time instant t4 in FIG. 10: step V7 in FIG. 9).

After this, the CPU 22 uses a period of time lasting until unlocking the brakes prior to the next robot work routine. Practically, during this period, the CPU 22 monitors the rotation states of the motors M1-M4 by making a comparison between- the differences Dd1-Dd4 and the threshold Dth (steps V8 and V9 in FIG. 9). Assume that the sub-contact 9*a* is closed at present. In this case, the CPU 22 detects that the sub-contact 9*a* is energized and the sub-relay 9 is malfunctioning (YES at step V8), thus proceeding to step V4 to end this relay check process (i.e., the stop due to an error). In addition, when all the sub-contacts 9*a*-12*a* are opened so that the CPU 22 should unlock the breaks (YES at steps V5 and V9), the CPU 22 drives the sub-relays 9-12 to open its sub-contacts 9*a*-12*a* (step V10 in FIG. 9). Thus the electromagnetic brakes B1-B4 are unlocked, that is, released from their arm-locked states. This relay check process then returned to its step V1.

The advantages of the present invention are as follows.

The relay check process for the sub-relays 9-12 are carried out through detecting the rotation of the motors M1-M4. When any of the motors M1-M4 rotates, any of the sub-contacts 9*a*-12*a*, which is a contact to switch current to be supplied to the electromagnetic brake for braking the motor which is now rotating. This relationship between the rotation of the motors and the energization of the sub-contacts 9*a*-12*a* can be used to check malfunctions which may occur in the sub-relays 9-12, as described in the present embodiment.

Furthermore, the encoders E1-E4 integrally attached to the motors M1-M4 to control the rotation thereof are used to detect the motor rotation. Hence, compared with the robot controller 1 described in the first embodiment which requires the second energization detecting circuit 7, costs for manufacturing the robot controller 21 can be lowered.

The present invention will not be limited to those described in the foregoing embodiments, and may be modified into various kinds of other forms.

A first modification relates to the configuration of the control means. In the first embodiment, the control means 15 is composed of the combination of the CPU 12 and the relay control circuit 3, while in the second embodiment, the control means 25 is composed of the combination of the CPU 22 and the relay control circuit 23. The control means may be provided a relay control circuit which contains components necessary for detecting malfunctions of the electromagnetic brakes B1-B4.

A second modification is how to detect how the motors M1-M4 rotate. In the second embodiment, the CPU 22 reads data showing amounts of motor rotation from the register RG of the relay control circuit 23, so that the rotating states of the motors M1-M4 can be detected. This may be modified such that the CPU 22 detects the rotating states of those motors M1-M4 using the pulse signals from the encoders E1-E4 (or the counts, if the encoders are provided with counters)

A third modification concerns the second malfunction check. This check process may be carried out only when it is necessary, not limited to the case where, as described, every time the given robot routine work is finished. Moreover, when the first malfunction check performed when the activation is done is sufficient in detecting malfunctions of the electromagnetic brakes B1-B4, the second malfunction check may be omitted.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for detecting a malfunction caused in an electromagnetic brake of a robot, the electromagnetic brake for braking a motor incorporated in the robot, the electromagnetic brake being provided with an excitation coil and being locked when the excitation coil is not excited, the controller comprising:
a main relay that has a main contact placed in a current supply path connected from a direct-current power source to the excitation coil and that is operable to open and close the main contact;
a sub-relay that has a sub-contact placed between the main contact and the exaction coil in the current supply path;
first energization detecting means that detects whether or not the main contact is energized;
second energization detecting means that detects whether or not the sub-contact is energized;
first control means for controlling the main relay and the sub-relay to open the main contact and the sub-contact when the robot is activated;
first detecting means for detecting whether or not the main contact is malfunctioning, by monitoring an energized state of the main contact using the first energization detecting means in response to the control by the first control means, the energization of the main contact showing that the main contact is malfunctioning;
second control means for i) stopping activation of the robot when the first detecting means shows that the main contact is malfunctioning and ii) controlling the main relay to close the main contact for a given period of time when the first detecting means shows that the main contact is operating normally, the given period of time being set to a time length that allows the second energization detecting means to detect whether or not the sub-contact is energized;
second detecting means for detecting whether or not the sub-contact is malfunctioning, by monitoring an energized state of the sub-contact using the second energization detecting means during the given period of time, the energization of the sub-contact showing that the sub-contact is malfunctioning; and
third control means for i) stopping the activation of the robot when the second detecting means shows that the sub-contact is malfunctioning and ii) controlling the main relay to close the main contact when the second detecting means shows that the sub-contact is operating normally.

2. The apparatus of claim 1, wherein the third control means controls the main relay to open the main contact when the second detecting means shows that the sub-contact is malfunctioning.

3. The apparatus of claim 1, wherein the electromagnetic brakes consists of a plurality of electromagnetic brakes each having an excitation coil and each being locked when the excitation coil is not excited,
the main relay is one in number;
the sub-relay consists of a plurality of sub-relays each having a sub-contact, the sub-contacts of the sub-relays respectively being placed in a plurality of mutually-parallel current supply paths respectively connecting the excitation coils and the main contact;
the second energization detecting means detects whether or not each of the sub-contacts is energized; and
the second detecting means checks whether or not each of the sub-contacts is malfunctioning, by monitoring the energized state of each of the sub-contacts using the second energization detecting means.

4. The apparatus of claim 1, comprising
fourth control means for controlling the sub-relay to open the sub-contact every time when the robot has finished a given work routine;
third detecting means for detecting whether or not the sub-contact is malfunctioning, by monitoring the energized state of the sub-contact using the second energization detecting means in response to the control of the fourth control means; and
fifth control means for controlling the main relay to open the main contact when the third detecting means shows that the sub-contact is malfunctioning.

5. The apparatus of claim 4, comprising
a CPU (central processing unit) that controls operations of the electromagnetic brake by issuing a control command and issues a command requiring unlocking the brake;
a relay control circuit that controls the main relay and the sub-relay in response to the control command;
setting means that gives the relay control circuit a command rejection mode in which the command requiring unlocking the brake is rejected, when the first control means operates; and releasing means that releases the command rejection mode in the relay control circuit when the second detecting means shows that the sub-contact is operating normally.

6. The apparatus of claim 5, wherein the relay control circuit itself is formed to functionally include the first control means, the first detecting means, the second control means, the second detecting means, and the third control means.

7. The apparatus of claim 6, wherein
the second energization detecting means comprises a detector to detect whether or not the motor rotates, and
the first and second detecting means check that the main contact or the sub-contact is malfunctioning when the detector detects that the motor is rotating.

8. The apparatus of claim 7, wherein
the detector comprises an encoder outputting a pulse signal depending on the rotation of the motor, and
the first and second detecting means check that the main contact or the sub-contact is malfunctioning when an amount of the rotation of the motor calculated based on the pulse signal is over a given threshold.

9. The apparatus of claim 1, comprising
a CPU (central processing unit) that controls operations of the electromagnetic brake by issuing a control command and issues a command requiring unlocking the brake;
a relay control circuit that controls the main relay and the sub-relay in response to the control command;
setting means that gives the relay control circuit a command rejection mode in which the command requiring unlocking the brake is rejected, when the first control means operates; and
releasing means that releases the command rejection mode in the relay control circuit when the second detecting means shows that the sub-contact is operating normally.

10. The apparatus of claim 9, wherein the relay control circuit itself is formed to functionally include the first control means, the first detecting means, the second control means, the second detecting means, and the third control means.

11. The apparatus of claim 1, wherein
the second energization detecting means comprises a detector to detect whether or not the motor rotates, and
the first and second detecting means check that the main contact or the sub-contact is malfunctioning when the detector detects that the motor is rotating.

12. The apparatus of claim 11, wherein
the detector comprises an encoder outputting a pulse signal depending on the rotation of the motor, and
the first and second detecting means check that the main contact or the sub-contact is malfunctioning when an amount of the rotation of the motor calculated based on the pulse signal is over a given threshold.

13. A method of detecting a malfunction occurring in an electromagnetic brake of a robot, the electromagnetic brake for braking a motor incorporated in the robot, the electromagnetic brake being provided with an excitation coil and being locked when the excitation coil is not excited, a main relay having a main contact placed in a current supply path connected from a direct-current power source to the excitation coil and being operable to open and close the main contact, a sub-relay having a sub-contact placed between the main contact and the exaction coil in the current supply path, the method comprising:
a first control step controlling the main relay and the sub-relay to open the main contact and the sub-contact when the robot is activated;
a first detecting step detecting whether or not the main contact is malfunctioning, by monitoring an energized state of the main contact in response to the control by the first control step, the energization of the main contact showing that the main contact is malfunctioning;
a second control step i) stopping activation of the robot when the first detecting step shows that the main contact is malfunctioning and ii) controlling the main relay to close the main contact for a given period of time when the first detecting step shows that the main contact is operating normally, the given period of time being set to a time length that allows detection as to whether or not the sub-contact is energized;
a second detecting step detecting whether or not the sub-contact is malfunctioning, by monitoring an energized state of the sub-contact during the given period of time, the energization of the sub-contact showing that the sub-contact is malfunctioning;
a third control step i) stopping the activation of the robot when the second detecting step shows that the sub-contact is malfunctioning and ii) controlling the main relay to close the main contact when the second detecting step shows that the sub-contact is operating normally.

14. The method of claim 13, comprising
a fourth control step controlling the sub-relay to open the sub-contact every time when the robot has finished a given work routine;
a third detecting step detecting whether or not the sub-contact is malfunctioning, by monitoring the energized state of the sub-contact in response to the control of the fourth control step; and
a fifth control step controlling the main relay to open the main contact when the third detecting step shows that the sub-contact is malfunctioning.

* * * * *